US009869005B2

(12) United States Patent
Berry et al.

(10) Patent No.: US 9,869,005 B2
(45) Date of Patent: Jan. 16, 2018

(54) PROCESSES FOR RARE EARTHS RECOVERY FROM WET-PROCESS PHOSPHORIC ACID

(71) Applicant: K-TECHNOLOGIES, INC., Lakeland, FL (US)

(72) Inventors: William W. Berry, Lakeland, FL (US); Thomas E. Baroody, Lakeland, FL (US)

(73) Assignee: K-TECHNOLOGIES, INC., Lakeland, FL (US)

(*) Notice: Subject to any disclaimer, the term of this patent is extended or adjusted under 35 U.S.C. 154(b) by 112 days.

(21) Appl. No.: 14/416,267

(22) PCT Filed: Jul. 21, 2013

(86) PCT No.: PCT/US2013/051416
§ 371 (c)(1),
(2) Date: Jan. 21, 2015

(87) PCT Pub. No.: WO2014/018421
PCT Pub. Date: Jan. 30, 2014

(65) Prior Publication Data
US 2015/0167120 A1  Jun. 18, 2015

Related U.S. Application Data

(60) Provisional application No. 61/674,300, filed on Jul. 21, 2012.

(51) Int. Cl.
C22B 59/00 (2006.01)
C22B 3/42 (2006.01)
(Continued)

(52) U.S. Cl.
CPC ............... *C22B 59/00* (2013.01); *B01J 39/05* (2017.01); *B01J 39/20* (2013.01); *B01J 45/00* (2013.01);
(Continued)

(58) Field of Classification Search
CPC .... B01J 49/0008; B01J 49/0069; B01J 39/20; B01J 39/046; B01J 39/043; B01J 45/00;
(Continued)

(56) References Cited

U.S. PATENT DOCUMENTS 2,815,322 A * 12/1957 Higgins ................... B01J 47/10
134/25.5
4,305,912 A * 12/1981 Pyrih ..................... C22B 60/026
423/10
(Continued)

FOREIGN PATENT DOCUMENTS

CN  102312089  *  1/2012
JP  S63206313 A  8/1988
(Continued)

OTHER PUBLICATIONS

Translation of Japan 08-048507 A, Feb. 1996.*
(Continued)

*Primary Examiner* — Steven J Bos
(74) *Attorney, Agent, or Firm* — Greer, Burns & Crain; Gregory P. Einhorn

(57) ABSTRACT

In alternative embodiments, the invention provides processes and methods for extracting and recovering rare earth materials from a wet-process phosphoric acid using one or more continuous ion exchange resin systems. In alternative embodiments, the method is particularly suited for use in extracting and recovering multiple rare earth materials present in low concentrations contained in wet-process phosphoric acid.

37 Claims, 1 Drawing Sheet

(51) Int. Cl.
| | |
|---|---|
| *B01J 39/20* | (2006.01) |
| *B01J 45/00* | (2006.01) |
| *B01J 47/026* | (2017.01) |
| *C01F 17/00* | (2006.01) |
| *C22B 3/06* | (2006.01) |
| *B01J 39/05* | (2017.01) |
| *B01J 49/06* | (2017.01) |
| *B01J 49/53* | (2017.01) |

(52) U.S. Cl.
CPC ............ *B01J 47/026* (2013.01); *B01J 49/06* (2017.01); *B01J 49/53* (2017.01); *C01F 17/0006* (2013.01); *C01F 17/0081* (2013.01); *C22B 3/06* (2013.01); *C22B 3/42* (2013.01); *Y02P 10/234* (2015.11)

(58) Field of Classification Search
CPC .... B01J 47/026; C01F 17/0006; C22B 59/00; C22B 3/06; C22B 3/42
USPC .............................................. 423/21.5, 321.1
See application file for complete search history.

(56) References Cited

U.S. PATENT DOCUMENTS 4,394,353 A * 7/1983 Miyake ................ B01D 15/422
 210/674
2012/0114538 A1* 5/2012 Abramov ................ C22B 3/065
 423/21.5

FOREIGN PATENT DOCUMENTS

| JP | 08-048507 | * | 2/1996 |
| RU | 2412265 C1 | | 2/2011 |
| WO | 2006058508 A1 | | 6/2006 |

OTHER PUBLICATIONS

Vorotilina, E., Written Opinion of the International Searching Authority, dated Nov. 28, 2013, 5 pages.
Vorotilina, E., International Search Report, dated Nov. 28, 2013, 3 pages.
Vorotilina, E., International Preliminary Report on Patentability, dated Nov. 28, 2013, 5 pages.

* cited by examiner

PROCESSES FOR RARE EARTHS RECOVERY FROM WET-PROCESS PHOSPHORIC ACID

RELATED APPLICATIONS

This application is a national phase application claiming benefit of priority under 35 U.S.C. § 371 to Patent Convention Treaty (PCT) International Application Serial No: PCT/US2013/051416, filed Jul. 21, 2013, which claims benefit of priority to U.S. Provisional Patent Application Ser. No. 61/674,300, filed Jul. 21, 2012. The aforementioned applications are expressly incorporated herein by reference in their entirety and for all purposes.

TECHNICAL FIELD

This invention generally relates to inorganic chemistry and industrial rare earth recovery. In particular, in alternative embodiments, the invention provides processes and methods for the recovery, removal or extracting of rare earth materials from a wet-process phosphoric acid using one or more continuous ion exchanges comprising cationic exchange resins. In alternative embodiments, the method is particularly suited for use in extracting and recovering multiple rare earth materials present in low concentrations contained in wet-process phosphoric acid.

BACKGROUND

The production of many commercially valuable rare earth oxides, or rare earth metal compounds, from mineral ores such as monazite includes first mining the ore, beneficiation of the ore, and subsequent chemical treatment of the ore to recover the rare earth content, which typically ranges from 1% to sometimes in excess of 10% mixed rare earth content. The chemical treatment step is utilized to convert metal species in the mineral ore to metal species which are soluble in aqueous systems so that the metal values may be separated out by solvent extraction systems and the like.

The entire cost of mining a mineral ore with 1% to greater than 10% rare earth content and the subsequent chemical treatment and separation of the rare earth materials is tied directly to the rare earth material; conversely on the order of 90% to 99% of the material processed in a typical approach to rare earth recovery is generated as a waste or slag product.

It is well known that many phosphate rock deposits contain rare earths and that a portion of these materials are dissolved during the processing of the rock to produce a wet-process phosphoric acid. In this case, the primary component of interest is the phosphate value, which is then used to produce various phosphate products, e.g. diammonium phosphate fertilizer. The cost of mining, beneficiation, and subsequent processing is associated with the phosphate content. Thus any rare earth dissolved into the acid has essentially no cost associated with it since it currently remains in the phosphoric acid.

While recovery of the rare earths from phosphoric acid would be attractive, to date there has not been an effective processing technology that would extract the rare earth materials from the phosphoric acid in a cost-effective manner. Thus, it would be valuable to find a method to recover rare earth materials from a primary phosphoric acid stream where the cost of mining, benefaction and chemical treatment was borne entirely by the principle phosphoric acid product.

SUMMARY

The present invention provides a processes and methods for extracting, isolating or recovering rare earth materials from a starting material, such as phosphoric acid. In alternative embodiments, the starting material comprising a rare earth component, or a mixture of rare earth components, is applied to continuous ion exchange comprising a cationic exchange resin. This allows for large volumes of phosphoric acid to be processed economically and safely, and allow for a highly effective recovery of the rare earth materials without any chance of negatively impacting the quality of the phosphoric acid.

The invention provides processes and methods for the for the removal of a rare earth component, or a mixture of rare earth components, from wet-process phosphoric acid comprising use of one or more continuous ion exchange systems, comprising:

(a) providing a phosphoric acid solution, or a solution comprising a phosphoric acid, or a phos-acid feedstock, comprising the rare earth components, or mixture of rare earth components;

(b) providing a continuous ion exchange system comprising a strong cationic exchange resin, or equivalent material or composition, capable of binding the rare earth components, or mixture of rare earth components, wherein the strong cationic resin, or equivalent material or composition, is in the H+ form, and optionally the strong cationic exchange resin, or equivalent material or composition, comprises:

a PUROLITE SST-60™ material, comprised of gel polystyrene crosslinked with divinylbenzene (DVB) and a sulfonic acid functional group (Purolite, Bala Cynwyd, Pa.), or equivalents;

a PUROLITE C-100™ resin, comprised of gel polystyrene crosslinked with divinylbenzene (DVB) and a sulfonic acid functional group (Purolite, Bala Cynwyd, Pa.), or equivalents; or a DOWEX 50™ or DOW 650™ (DOW, Midland, Mich.), functionalized styrene/divinylbenzene copolymer cationic ion exchange resins, or equivalents thereof; or a resin, a composition or a material, or a non-resin solid or a semi-solid material, comprising chelating groups, functionalities or moieties capable of binding the rare earth components, or mixture of rare earth components from a sample, wherein optionally the compositions comprise beads, wires, meshes, nanobeads, nanotubes, nanowires or other nano-structures, or hydrogels, where optionally the extracting phase (resin, or equivalent material or composition) comprises an impregnated material where a solid organic sorbing resin, or equivalent material or composition, is impregnated with an organic phosphate material, which optionally can be a di-2-ethylhexyl phosphoric acid;

(c) providing a "regeneration" solution comprising a strong acid, optionally comprising: a sulfuric acid ($H_2SO_4$) in the concentration range of about 15% to about 40%; a nitric acid (HNO3) in a concentration range of about 15% to about 30%; or, a hydrochloric acid (HCl) in a concentration range of about 15% to about 30%; or equivalents thereof;

(d) applying the solution or phosphoric acid solution or phos-acid feedstock of (a) to the strong cation exchange resin, or equivalent material or composition, under conditions that cause the rare earth components, or mixture of rare earth components, to remain on the cationic exchange resin, or equivalent material or composition, wherein optionally an effluent is produced that is substantially free of the rare earth components, or mixture of rare earth components, and substantially most of the rare earth components, or mixture of rare earth components remain bound to the strong cation exchange resin, or equivalent material or composition; and, optionally the phos-acid concentration is in the range of about 15% to about 30% phos-acid ($P_2O_5$) for a typical operation; or optionally a phos-acid ($P_2O_5$) concentration of about 40% up to about 54% (wherein each process is different, so there may be specific requirements for a given site);

(e) removing the rare earth components, or mixture of rare earth components, or eluting the rare earth components, or mixture of rare earth components, from the strong cationic exchange resin, or equivalent material or composition, using the "regeneration" solution, resulting in (or thereby producing) a solution of the acid, or the sulfuric acid ($H_2SO_4$), or equivalent, or using a complexing agent such as ammonium glycolate to produce a regeneration eluant solution containing or comprising the rare earth components, or mixture of rare earth components as an eluate.

In alternative embodiments, the rare earth components, or mixture of rare earth components, can comprise any of the so-called rare earth materials, or the rare earth components, or mixture of rare earth components, can comprise a lanthanum; a cerium; a europium; a neodymium; a yttrium, wherein optionally the amounts and ratios of these materials will vary between acid streams.

In alternative embodiments, the phosphoric acid solution, solution comprising a phosphoric acid, or the phos-acid feedstock further comprises one or more minor element (ME) components, or a mixture of minor element components, and the one or more minor element (ME) components, or a mixture of minor element components bind to the cationic exchange resin, or equivalent material or composition, and are eluted with the rare earth components, or mixture of rare earth components by the "regeneration" solution, and optionally the one or more minor element (ME) components, or a mixture of minor element components, comprise an iron, an aluminum and/or a magnesium, or comprise an iron, an aluminum and/or a magnesium and their respective oxides.

In alternative embodiments, the phosphoric acid solution, solution comprising a phosphoric acid, or phos-acid feedstock, is first treated, or pre-treated, with a clarification process or a filtering process, or a clarification aid, wherein optionally the clarification process, filtering process or clarification aid comprises an activated clay, an activated carbon, an activated silica, or equivalents, or any combination thereof.

In alternative embodiments, the processes and methods of the invention further comprise contacting the acid "regeneration" solution containing (as eluates) rare earth components, or mixture of rare earth components, and if present, the minor element components, with a second ion exchange resin, or equivalent material or composition, comprising a complexing resin, or equivalent material or composition, with a specific affinity for a rare earth components, or mixture of rare earth components, from a strong acid media, wherein the second ion exchange resin binds the rare earth components and separates the rare earth components from the minor element components, wherein optionally the complexing resin, or equivalent material or composition, comprises:

a LEWATIT® TP 260™, a weakly acidic cationic exchange resin with chelating amino methyl phosphonic acid groups for the selective removal of transition heavy metals (Lanxess, Maharashtra, India), or equivalents thereof;

a PUROLITE S-950™, a macroporous aminophosphonic acid chelating resin, designed for the removal of cations of metals (Purolite, Bala Cynwyd, Pa.), or equivalents thereof; or an AMBERLITE IRC-747™, an aminophosphonic chelating resin (Dow; Rohm & Haas, Philadelphia, Pa.), or equivalents thereof, or equivalents thereof;

alternatively impregnated substrate materials where an organic sorbent is impregnated with an organic extractant such as tri-butyl phosphate or di-2-ethylhexyl phosphoric acid; or a resin, a composition or a material, or a non-resin solid or a semi-solid material, comprising chelating groups, functionalities or moieties capable of binding the rare earth components, or mixture of rare earth components from a sample, wherein optionally the compositions comprise beads, wires, meshes, nanobeads, nanotubes, nanowires or other nano-structures, or hydrogels.

In alternative embodiments, the processes and methods of the invention further comprise selectively removing (or eluting) the rare earth components, or mixture of rare earth components, from the second ion cationic exchange resin, or equivalent material or composition, resulting in a solution containing substantially only the rare earth components with no or minimal minor element components, and optionally the eluants for the second resin system, or equivalent material or composition, comprise acids, optionally comprise a hydrochloric acid; or an ammonium solution or an ammonium sulfate solution at a pH greater than about 8; or, an organic complexing agents, optionally an ammonium glycolate, at a pH of about 3 to about 7 range.

In alternative embodiments, the processes and methods of the invention further comprise contacting the solution containing the rare earth components, or mixture of rare earth components, with no or minimal minor element components from the second ion cationic exchange resin, or equivalent material or composition, with a third ion cationic exchange resin system or equivalent material or composition, comprising a resin or equivalent material or composition with a specific affinity for one or more rare earth components, or mixtures of rare earth components, where the third ion exchange resin, or equivalent material or composition, binds one or more rare earth components, or mixtures of rare earth components, and separates the rare earth components, or mixtures of rare earth components, from each other, and optionally the third ion cationic exchange resin system, or equivalent material or composition, comprises:

a PUROLITE SST-60™ material, comprised of gel polystyrene crosslinked with divinylbenzene (DVB) and a sulfonic acid functional group (Purolite, Bala Cynwyd, Pa.), or equivalents;

a PUROLITE C100™ resin, comprised of gel polystyrene crosslinked with divinylbenzene (DVB) and a sulfonic acid functional group (Purolite, Bala Cynwyd, Pa.), or equivalents; or a DOWEX 50™ or DOW 650™ (DOW, Midland, Mich.), functionalized styrene/divinylbenzene copolymer cationic ion exchange resins, or equivalents thereof; or a resin, a composition or a material, or a non-resin solid or a semi-solid material, comprising chelating groups, functionalities or moieties capable of binding the rare earth components, or mixture of rare earth components from a sample, wherein optionally the compositions comprise beads, wires, meshes, nanobeads, nanotubes, nanowires or other nano-structures, or hydrogels.

In alternative embodiments, the processes and methods of the invention further comprise removing the rare earth components from the third ion exchange resin, or equivalent material or composition, resulting in a solution containing only or substantially only rare earth components, or mixtures of rare earth components, or resulting in a solution substantially lacking or having minimal amounts of minor element components.

In alternative embodiments, the solution containing specific rare earth components is a solution from which a rare earth salt can be precipitated, and optionally solution, or the regeneration solution, for the $3^{rd}$ processing step comprises a complexing material, optionally an ammonium glycolate (e.g., at a pH from about 3 to about 7) which allows for initial separation of the various rare earth groups; or optionally a sulfuric acid or a nitric acid (e.g., in about a 10% to about a 20% concentration range) is used for regeneration of the $3^{rd}$ resin if initial group separation is not needed.

In alternative embodiments, the processes and methods of the invention further comprise contacting the solution containing specific rare earth components with another ion exchange system, a separation method or an ion chromatography system to further separate rare earth components from each other or to produce more purified rare earth components, or mixtures of rare earth components. In alternative embodiments, the strong cationic extracting resin binds the rare earth components, or mixtures of rare earth components, primarily.

In alternative embodiments, the invention provides industrial processes for extracting, isolating or recovering a rare earth component, or a mixture of rare earth components, from a sample, e.g., an ore, or a phosphate rock deposit, comprising an industrial process as set forth in FIG. 1, or any portion or sub-process thereof, wherein optionally the rare earth component, or mixture of rare earth components, is extracted, isolated or recovered from a sample, wherein optionally the sample comprises an ore, a mineral ore, a monazite, or a phosphate rock deposit.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

The drawings set forth herein are illustrative of embodiments of the invention and are not meant to limit the scope of the invention as encompassed by the claims.

Figures are described and discussed herein.

Like reference symbols in the various drawings indicate like elements.

Figure 1:
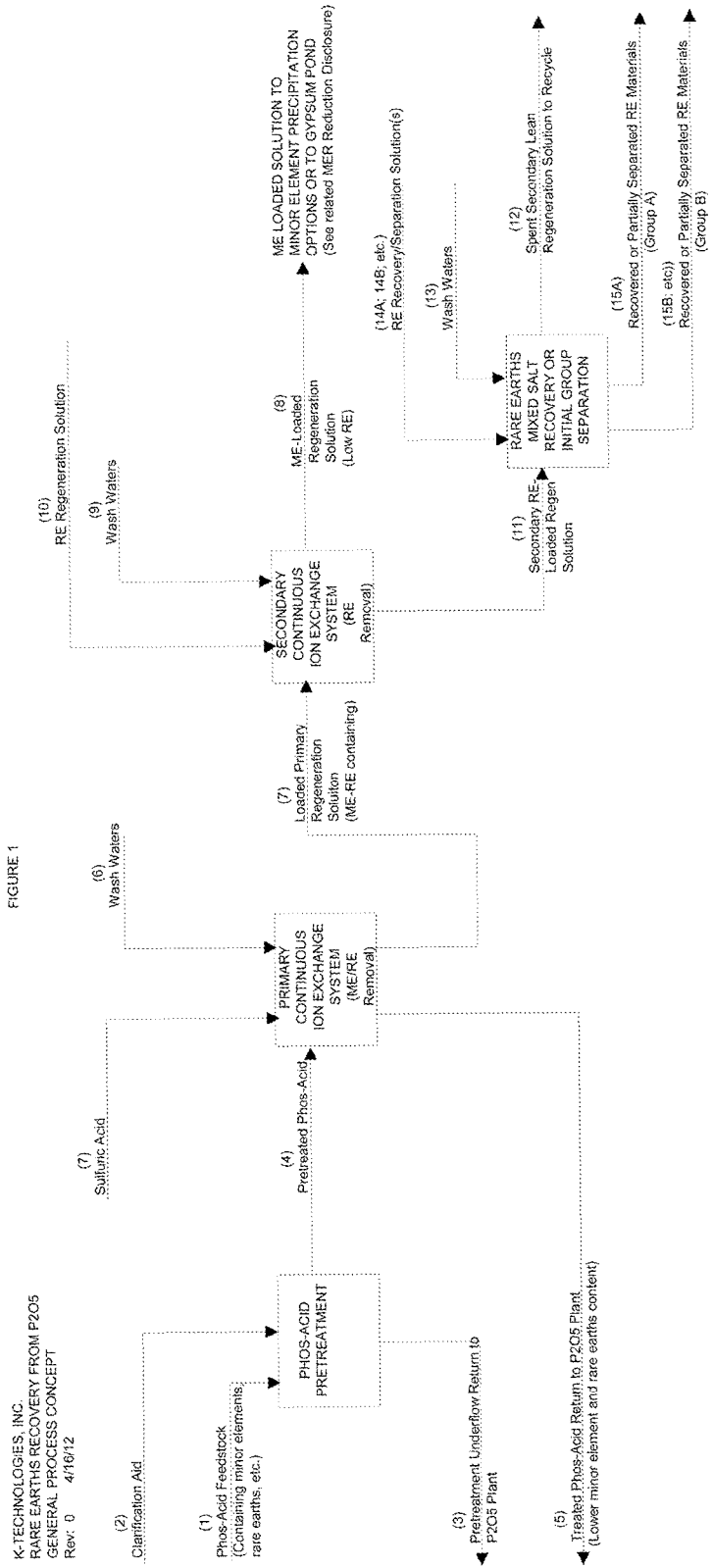
FIG. 1 schematically illustrates an exemplary process of the invention, an overall process flow diagram for an exemplary rare earth extraction or recovery process from a phosphoric acid solution, or a solution comprising a phosphoric acid, or a phos-acid feedstock.

Reference will now be made in detail to various exemplary embodiments of the invention, examples of which are illustrated in the accompanying drawings. The following detailed description is provided to give the reader a better understanding of certain details of aspects and embodiments of the invention, and should not be interpreted as a limitation on the scope of the invention.

DETAILED DESCRIPTION

In alternative embodiments, the invention provides processes and methods for the recovery or the removal of rare earths, or their respective oxides, from a wet-process phosphoric acid using a continuous ion exchange approach. In alternative embodiments, processes and methods of the invention provide a highly effective recovery of rare earth materials without negatively impacting the quality of the phosphoric acid. Also, in alternative embodiments, the processes and methods of the invention recover rare earth materials from a primary phosphoric acid stream where the cost of mining, beneficiation, and chemical treatment is substantially borne by the production of the phosphoric acid principle product.

In alternative embodiments of the rare earth recovery processes of the invention, a phos-acid (e.g., nominal, 20% to 35%, or 25% to 30%, $P_2O_5$) (stream 1) is received, e.g., from a main phos-acid plant, and then processed, clarified or filtered, or treated with a clarification aid (2), in order to reduce the suspended solids content in the phos-acid stream. This treatment results in the reduction of the suspended solids, along with some removal of the heavier color bodies. The extent of pretreatment required is specific to each phosphoric acid source and will vary accordingly.

In alternative embodiments, the underflow solids materials (3) recovered in this step can be filtered and disposed of, or returned to a waste pond or a gypsum stack, or alternatively returned to the phos-acid plant and combined with the filter feed slurry, e.g., a gypsum/phos-acid. In alternative embodiments, return of the solids to the phos-acid plant is preferred, if possible, in order to minimize phos-acid ($P_2O_5$) losses and dilution of the phos-acid.

In alternative embodiments, the pretreated phos-acid ($P_2O_5$) (4) is then processed in a modified continuous ion exchange ("CIX") system (primary system), where it is contacted with a specific ion exchange resin in a continuous fashion at a high ratio of resin to acid. In alternative embodiments, the resin rates can range from about 0.3 to about 0.6 volumes of resin per volume of acid treated with 0.4 being a "typical" exemplary treatment ratio. In alternative embodiments, rare earth (RE) components are extracted from the phosphoric acid (phos-acid, or $P_2O_5$), i.e., the rare earth components, or mixture of rare earth components, bind to the cationic exchange resin component of the continuous ion exchange ("CIX") system. In alternative embodiments, when present, substantially all or a portion of the minor element (ME) components, e.g., iron, aluminum, magnesium and other cations, also are extracted from the phos-acid ($P_2O_5$). The overall extraction mechanism is the exchange of the cations for H+ ions on the cationic exchange resin component of the continuous ion exchange ("CIX") system. The H+ results in the conversion of the various cationic-phosphate impurities in the phos-acid to be converted to a phos-acid form (thus increasing overall $P_2O_5$ yield). The large resin to acid volume ratios used, while effective for carrying out the extraction, are not practical when considering the more conventional ion exchange approaches, e.g. fixed beds or simulated moving beds; thus, before this invention, consideration of potential rare earth recovery has not been seriously considered. The application of processes of this invention, e.g., the exemplary continuous approach, overcomes the limitations associated with non-continuous approaches.

In alternative embodiments, the treated acid (5) with lowered RE and ME and is then directed to a surge tank and returned to a phos-acid plant for normal downstream processing.

The general exchange mechanism involved in the RE and ME removal (primary) stage is as follows:

$$3R-H+ + RE/ME-PO_4 \rightarrow 3R-RE/ME + H_3PO_4$$

where R is the solid ion exchange resin; note that the "impurity" RE/ME is converted to $H_3PO_4$ which is the desired form for phosphate (P) in the acid stream.

In alternative embodiments, the ion exchange resin, now loaded with the RE, ME and other cationic materials, is water washed (6) in a continuous fashion. The control of the water flows can be such that overall phos-acid ($P_2O_5$) dilution is minimized.

The RE/ME-loaded resin is then continuously regenerated with a solution of sulfuric acid (7). The acid removes the RE, ME and other cationic materials from the resin, to produce a RE-ME/cationic-sulfate solution (the spent regeneration solution or SRS), and the H+ from the acid is loaded back onto the resin to allow for resin reuse. In alternative embodiments, the regenerated resin is again washed with water, and then returned to RE-ME/cation removal service as the cycle is repeated.

The general exchange mechanism involved in the resin regeneration stage (or exemplary cationic exchange mechanism) is as follows:

$$R-RE + H_2SO_4 \rightarrow R-H+ + RE-SO_4$$

or $$R-RE/ME + H_2SO_4 \rightarrow R-H+ + RE/ME-SO_4$$

The so called "Spent Regeneration Solution" (SRS) (7) now contains the RE/cationic sulfate or the RE-ME/cationic sulfate impurities (the eluate off the cationic exchange resin) along with residual free $H_2SO_4$.

In alternative embodiments, the SRS is diluted with water to a concentration of about 10% sulfuric acid content (maximum) then transferred to (applied to) a secondary continuous ion exchange system. In the secondary CIX system, the RE/ME-containing solution is contacted with a second cationic ion exchange resin (complexing-type material) and the rare earths are selectively extracted from the regeneration solution. The complexing resins used to practice this invention differ from the conventional cationic resins in that they contain functional groups that behave somewhat along the lines of organic extractants that are used in solvent extraction processes. For example, resins used to practice this invention include:
  a LEWATIT® TP 260™, a weakly acidic cationic exchange resin with chelating amino methyl phosphonic acid groups for the selective removal of transition heavy metals (Lanxess, Maharashtra, India), or equivalents thereof;
  a PUROLITE S-950™, a macroporous aminophosphonic acid chelating resin, designed for the removal of cations of metals (Purolite, Bala Cynwyd, Pa.), or equivalents thereof; or
  AMBERLITE IRC-747™, an aminophosphonic chelating resin (Dow; Rohm & Haas, Philadelphia, Pa.), or equivalents thereof;
act in complexing fashions. In alternative embodiments, impregnated substrates, which can be sorbent materials that are impregnated with specific organic extractants such as tri-butyl phosphate (TBP) or di-2-ethylhexyl phosphoric acid (DEPA), also can be used for this secondary extraction step.

In alternative embodiments, the low-RE solution (8), i.e. the ME-containing solution, is sent to further processing for ME precipitation or removal, or sent to the phos-acid plant gypsum stack system.

The secondary resin, now loaded with the RE components, is washed with water (9), then treated with a secondary RE regeneration solution (10) which removes the loaded rare earths from the resin and transfers them to a concentrated RE-containing regeneration solution. The resin is again washed (9) and returned to service. The regeneration solution can be an ammonium material, such as ammonium sulfate at a pH greater than about 8 or organic complexing materials such as ammonium glycolate, or ammonium citrate (at pH from about 5 to about 7). Hydrochloric acid can also be used as a regeneration solution. In general, chloride-based regeneration solutions would not be used in most of the conventional phos-acid ($P_2O_5$) facilities if there is any chance that chloride-bearing solutions could enter into the phos-acid stream. This is due to corrosion considerations in the downstream phos-acid ($P_2O_5$) processing steps.

In alternative embodiments, the loaded RE-containing regeneration solution from the secondary step (11) is transferred (or applied to) to a third ion exchange system for the recovery of the rare earths as a single mixed salt material or, with appropriate system operation, recovery of the rare earths as initial groups, e.g. "lights"; "mids"; "heavies". The spent solution from the RE recovery system (12) is returned to the secondary ion exchange operation. In the third ion exchange step, a cationic resin that is in the H+ form is used, such as for example:
  a PUROLITE SST-60™ material, comprised of gel polystyrene crosslinked with divinylbenzene (DVB) and a sulfonic acid functional group (Purolite, Bala Cynwyd, Pa.), or equivalents;
  a PUROLITE C100™ resin, comprised of gel polystyrene crosslinked with divinylbenzene (DVB) and a sulfonic acid functional group (Purolite, Bala Cynwyd, Pa.), or equivalents; or
  a DOWEX MSC 650™ material (Dow Chemical, Midland, Mich.), or equivalents.

The loaded RE recovery resin is initially water washed (13), then treated with selected regeneration solutions (14A; 14B; etc.) and the rare earths removed from the resin as a mixed material (15A) (in which case a single regeneration solution is used), or alternatively as various rare earth groups (15A; 15B; etc.) if multiple regeneration solutions are used. These regeneration solutions can then be processed to precipitate mixed rare earth salts, e.g. RE-carbonates, or group salts, e.g. lights-carbonates; mids-carbonates; etc. The regeneration solutions for the $3^{rd}$ processing step can include complexing materials, such as ammonium glycolate (at pH from 3 to about 7) which allows for initial separation of the various rare earth groups. Sulfuric acid or nitric acid (in the 10 to 20% concentration range) can also be used for regeneration of the $3^{rd}$ resin if initial group separation is not needed.

In alternative embodiments, use of these exemplary processes of the invention allow for rare earths to be effectively removed from a phos-acid stream, along with some of the interfering minor element materials, if present, and recovered as concentrated salt materials. These mixed rare earths can then be processed to further purify the rare earths to produce individual rare earth salts or oxide, e.g. europium oxide; neodymium oxide; and the like. There are various existing technologies for the separation of the rare earths, and advanced technologies known in the art.

Without further elaboration, it is believed that one skilled in the art can, using the preceding description, utilize the present invention to its fullest extent. The following examples are to be considered illustrative and thus are not limiting of the remainder of the disclosure in any way whatsoever.

A number of embodiments of the invention have been described. Nevertheless, it will be understood that various modifications may be made without departing from the spirit and scope of the invention. Accordingly, other embodiments are within the scope of the following claims.

What is claimed is:

1. A method for the removal of a rare earth component, or a mixture of rare earth components, and one or more minor element components or mixture of minor element components, from a wet-process phosphoric acid, and subsequently separating the rare earth components or the mixture of rare earth components from the one or more minor element components or the mixture of minor element components, the method comprising use of two or more continuous ion exchange systems comprising a strong cationic exchange resin, comprising:
   (a) providing a phosphoric acid solution comprising:
      (i) the rare earth components or the mixture of rare earth components and the one or more minor element components, or the mixture of minor element components,
      (ii) a solution comprising a phosphoric acid and the rare earth components or the mixture of rare earth components and the one or more minor element components or the mixture of minor element components, or
      (iii) a phos-acid feedstock comprising the rare earth components or the mixture of rare earth components and the one or more minor element components or the mixture of minor element components;
   (b) providing:
   (1) a first continuous ion exchange system comprising a strong cationic exchange resin capable of binding:
      (i) the rare earth components, or the mixture of rare earth components and
      (ii) the one or more minor element components or the mixture of minor element components,
      wherein the strong cationic exchange resin is in the H+ form, and
   (2) a second continuous ion exchange system comprising a strong cationic exchange resin with a specific affinity for a rare earth component, or mixture of rare earth components;
   (c) providing an acid regeneration solution comprising a strong acid;
   (d) applying the provided phosphoric acid solution of (a), to the first continuous ion exchange system comprising a strong cationic exchange resin of (b) under conditions that cause the rare earth components, or the mixture of rare earth components, and the one or more minor element components or the mixture of minor element components, to remain on the first continuous ion exchange system comprising a strong cationic exchange resin;
   (e) removing the rare earth components, or the mixture of rare earth components and the one or more minor element components or the mixture of minor element components, or eluting the rare earth components, or the mixture of rare earth components and the one or more minor element components or the mixture of minor element components, from the first continuous ion exchange system comprising a strong cationic exchange resin using the acid regeneration solution, resulting in or thereby producing an acid regeneration solution eluant containing or comprising the rare earth components, or the mixture of rare earth components, and the one or more minor element components or the mixture of minor element components; and
   (f) contacting the acid regeneration solution eluant comprising as eluates the rare earth components, or the mixture of rare earth components, and the one or more minor element components or the mixture of minor element components, with the second continuous ion exchange system comprising a strong cationic exchange resin with a specific affinity for a rare earth component, or mixture of rare earth components,
   wherein the second continuous ion exchange system comprising a strong cationic exchange resin binds the rare earth components, or the mixture of rare earth components, and separates the rare earth components, or the mixture of rare earth components, from the one or more minor element components or the mixture of minor element components,
   wherein the one or more minor element components or the mixture of minor element components comprise:
   iron, aluminum and/or magnesium or their respective oxides.

2. The method of claim 1, wherein the provided phosphoric acid solution is first treated, or pre-treated, with a clarification process or a filtering process, or a clarification aid in order to remove suspended solids.

3. The method of claim 1, further comprising selectively removing or eluting the rare earth components, or mixture of rare earth components, from the second continuous ion exchange system comprising a strong cationic exchange resin resulting in a second eluate containing substantially only the rare earth components with no or minimal minor element components, or mixture of minor element components.

4. The method of claim 3, further comprising contacting the second eluate with a third continuous ion exchange system comprising a strong cationic exchange resin operating in a chromatographic mode,
   wherein the strong cationic exchange resin comprises a resin with a specific affinity for one or more rare earth components, or mixtures of rare earth components,
   and wherein the third continuous ion exchange system comprising a strong cationic exchange resin operating in a chromatographic mode selectively binds one or more rare earth components, or mixtures of rare earth components, and separates the rare earth components, or the mixtures of rare earth components, from each other.

5. The method of claim 4, further comprising removing one or a specific mixed group of the rare earth components from the third continuous ion exchange system comprising a strong cationic exchange resin operating in the chromatographic mode by eluting the strong cation resin with an organic complexing solution, optionally an ammonium glycolate, resulting in a solution containing only one or substantially a specific mixed group of target rare earth components, to the exclusion of the other remaining rare earth components, and resulting in a solution substantially lacking or having minimal amounts of the minor element components, or the mixture of minor element components.

6. The method of claim 5, wherein the solution containing specific rare earth components is a solution from which a rare earth salt can be precipitated.

7. The method of claim 5, further comprising contacting the solution containing specific rare earth components with one or more other ion exchange systems, operating in a chromatographic mode to further separate rare earth components from each other or to produce more purified rare earth components, or mixtures of rare earth components.

8. The method of claim 1, wherein the first continuous ion exchange system comprising a strong cationic exchange resin primarily binds the rare earth components, or mixtures of rare earth components, along with one or more minor element components or mixture of minor element components.

9. The method of claim 1, wherein the first and the second continuous ion exchange systems comprising a strong cationic exchange resin comprise a gel polystyrene crosslinked with divinylbenzene and a sulfonic acid functional group.

10. The method of claim 1, wherein the first continuous ion exchange system comprising a strong cationic exchange resin of step (b) capable of binding the rare earth components, or mixture of rare earth components, and one or more minor element components or mixture of minor element components, comprises beads, wires, meshes, nanobeads, nanotubes, nanowires, or hydrogels.

11. The method of claim 1, wherein in step (c) the strong acid comprises: a sulfuric acid in the concentration range of about 15% to about 40%.

12. The method of claim 1, wherein in step (c) the strong acid comprises: a nitric acid in a concentration range of about 15% to about 30%.

13. The method of claim 1, wherein in step (c) the strong acid comprises: a hydrochloric acid in a concentration range of about 15% to about 30%.

14. The method of claim 1, wherein in step (d) an effluent is produced that is substantially free of the rare earth components, or mixture of rare earth components, and one or more minor element components or the mixture of minor element components, and substantially most of the rare earth components, or mixture of rare earth components, and one or more minor element components or the mixture of minor element components, are bound to the first continuous ion exchange system comprising a strong cationic exchange resin.

15. The method of claim 1, wherein in step (d) the concentration of the phos-acid feedstock of (a) is in the range of about 15% to about 30% phos-acid.

16. The method of claim 1, wherein in step (d) the concentration of the phos-acid feedstock of (a) is in the range of about 40% up to about 54%.

17. The method of claim 2, wherein the clarification process, filtering process or clarification aid comprises an activated clay, an activated carbon, an activated silica, or any combination thereof.

18. The method of claim 9, wherein the resin further comprises:
a weakly acidic cationic exchange resin with chelating amino methyl phosphonic acid groups for the selective removal of transition heavy metals; or
a macroporous aminophosphonic acid chelating resin for the removal of metal cations.

19. The method of claim 9, wherein the resin further comprises impregnated substrate materials where an organic sorbent is impregnated with an organic extractant.

20. The method of claim 9, wherein the resin further comprises a composition or a material, or a non-resin solid or a semi-solid material, comprising chelating groups, functionalities or moieties capable of binding the rare earth components, or mixture of rare earth components from a sample.

21. The method of claim 18, wherein the resin comprises beads, wires, meshes, nanobeads, nanotubes, nanowires, or hydrogels.

22. The method of claim 3, wherein the eluate for the second continuous ion exchange system comprising a strong cationic ion exchange resin comprises acids, and optionally the acids comprise a sulfuric acid, a nitric acid, and a hydrochloric acid.

23. The method of claim 3, wherein the eluate for the second continuous ion exchange system comprising a strong cationic ion exchange resin comprises an ammonium solution or an ammonium sulfate solution at a pH greater than about 8.

24. The method of claim 5, wherein the eluate for the third continuous ion exchange system comprising a strong cationic ion exchange resin comprises an organic complexing agent.

25. The method of claim 4, wherein the resin in the third continuous ion exchange system comprising a strong cationic exchange resin operating in the chromatographic mode comprises a gel polystyrene crosslinked with divinylbenzene and a sulfonic acid functional group.

26. The method of claim 4, wherein the resin in the third continuous ion exchange system comprising a strong cationic exchange resin further comprises: a composition or a material, or a non-resin solid or a semi-solid material, comprising chelating groups, functionalities or moieties capable of binding the rare earth components, or mixture of rare earth components from a sample.

27. The method of claim 25, wherein the resin in the third continuous ion exchange system comprising a strong cationic exchange resin comprises or is manufactured as beads, wires, meshes, nanobeads, nanotubes, nanowires, or hydrogels.

28. The method of claim 6, wherein the solution from which a rare earth salt can be precipitated or the acid regeneration solution comprises a complexing material comprising an ammonium glycolate, optionally at a pH from about 3 to about 7, which allows for initial separation of the rare earth component, or mixture of rare earth components, and optionally is used for regeneration of the third continuous ion exchange system comprising a strong cationic exchange resin operating in the chromatographic mode if an initial group separation is not needed.

29. The method of claim 6, wherein the solution from which a rare earth salt is precipitated or the acid regeneration solution comprises sulfuric acid or nitric acid.

30. The method of claim 5, wherein the organic complexing solution comprises ammonium glycolate.

31. The method of claim 19, wherein the organic extractant comprises tri-butyl phosphate or di-2-ethylhexyl phosphoric acid.

32. The method of claim 29, wherein the solution from which a rare earth salt is precipitated or the acid regeneration solution comprises sulfuric acid or nitric acid is in about a 10% to about a 20% concentration range.

33. The method of claim 29, wherein the solution from which a rare earth salt is precipitated or the acid regeneration solution is used for regeneration of the third continuous ion exchange system comprising a strong cationic exchange resin operating in the chromatographic mode if an initial group separation is not needed.

34. The method of claim 1, wherein the acid regeneration solution is processed to precipitate a mixed rare earth salt, wherein optionally the mixed rare earth salt is a rare earth carbonate.

35. The method of claim 1, wherein the rare earth components or mixture of rare earth components, or the rare earth material, comprises lanthanum; cerium; europium; neodymium; or yttrium.

36. The method of claim 1, wherein in step (c) the strong acid comprises sulfuric acid, and use of the acid regeneration solution results in or thereby produces a solution of sulfuric acid.

37. The method of claim 24, wherein the eluate for the third continuous ion exchange system comprising a strong cationic exchange resin comprises an organic complexing agent comprising an ammonium glycolate, wherein optionally the organic complexing agent is at a pH of about 3 to about 7.

* * * * *